United States Patent [19]

Nakamura et al.

[11] Patent Number: 5,431,978
[45] Date of Patent: Jul. 11, 1995

[54] INFORMATION RECORDING MEDIUM AND RECORDING METHOD USING THE SAME

[75] Inventors: Naomasa Nakamura; Naoki Morishita, both of Yokohama, Japan

[73] Assignee: Kabushiki Kaisha Toshiba, Kanagawa, Japan

[21] Appl. No.: 213,730

[22] Filed: Mar. 16, 1994

[30] Foreign Application Priority Data

Sep. 7, 1993 [JP] Japan .................. 5-221905

[51] Int. Cl.⁶ .............................................. B32B 3/02
[52] U.S. Cl. ...................... 428/64.6; 428/203; 428/209; 428/411.1; 428/689; 428/697; 428/913; 369/283; 369/288; 346/135.1; 347/264
[58] Field of Search ............... 430/270, 271, 272, 273; 428/201, 203, 204, 206, 913, 64, 65, 93, 209, 411.1, 689, 697, 913; 346/135.1, 76 L; 369/283, 288

[56] References Cited

U.S. PATENT DOCUMENTS

| | | | |
|---|---|---|---|
| 4,305,081 | 12/1981 | Spong . | |
| 4,499,178 | 2/1985 | Wada et al. | 430/495 |
| 4,673,626 | 6/1987 | Takeda et al. | 430/14 |
| 5,100,700 | 3/1992 | Ide et al. | 428/64 |
| 5,206,114 | 4/1993 | Kobayashi | 430/270 |
| 5,249,175 | 9/1993 | Akahira et al. | 369/275.1 |

FOREIGN PATENT DOCUMENTS

| | | |
|---|---|---|
| 0548828 | 6/1993 | European Pat. Off. . |
| 0549024 | 6/1993 | European Pat. Off. . |
| 62-226446 | 5/1987 | Japan . |
| 2-5238 | 1/1990 | Japan . |

*Primary Examiner*—Patrick J. Ryan
*Assistant Examiner*—William A. Krynski
*Attorney, Agent, or Firm*—Banner & Allegretti, Ltd.

[57] ABSTRACT

According to this invention, there is provided an information recording medium including a substrate, a metal layer formed on the substrate, and a recording layer formed on the metal layer and being formed a recorded portion and a non-recorded portion by changing optical characteristics by radiating a recording light beam, wherein the recording layer contains GeSbTe, a reflectance of the recorded portion of the recording layer is higher than that of the non-recorded portion, and a reflectance of the non-recorded portion is not less than 10%. Focusing and tracking operations can be stably performed.

1 Claim, 4 Drawing Sheets

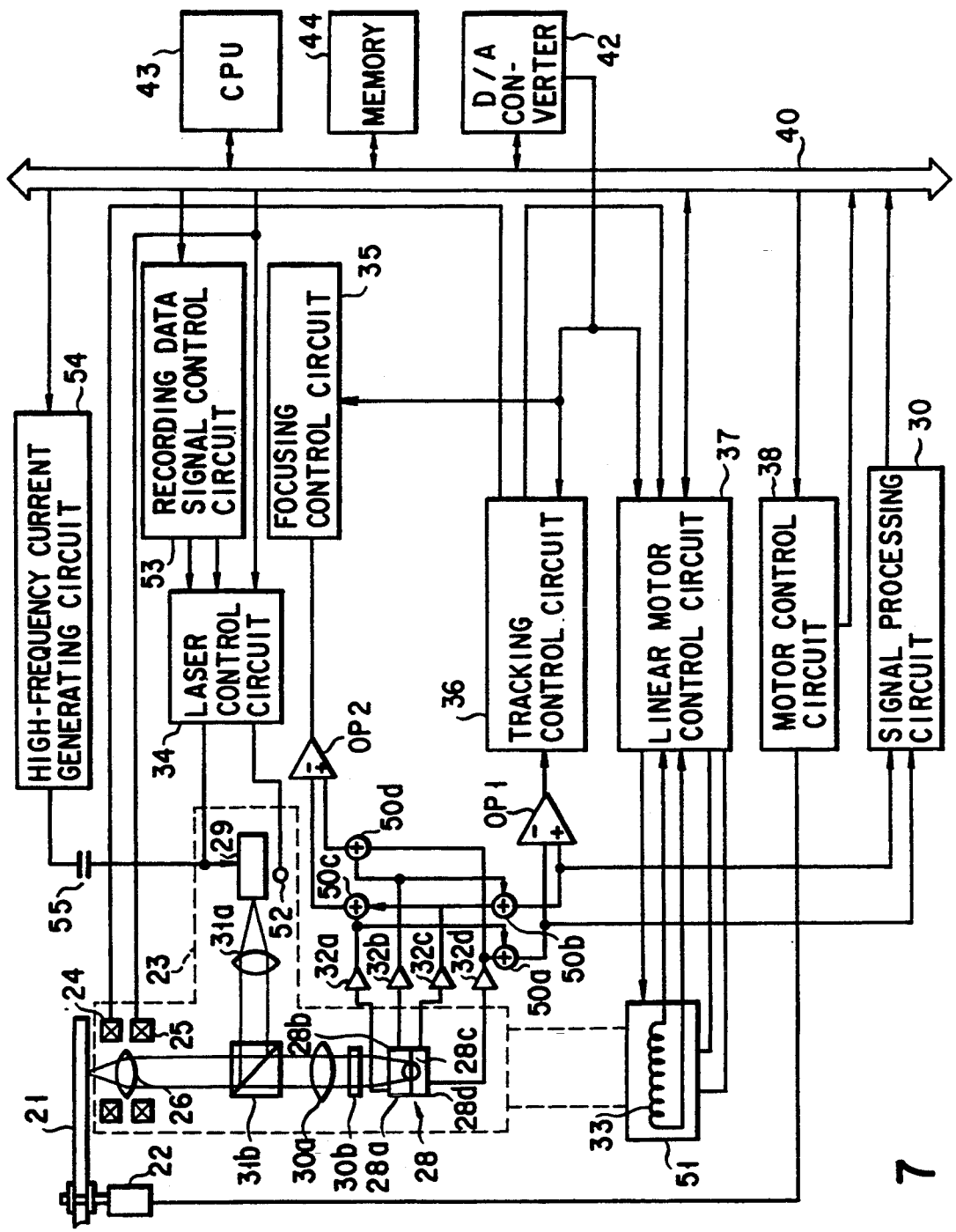
F I G. 7

INFORMATION RECORDING MEDIUM AND RECORDING METHOD USING THE SAME

BACKGROUND OF THE INVENTION

1. Field of the Invention

The present invention relates to an information recording medium and a recording method using the same.

2. Description of the Related Art

A conventional recordable/erasable information recording medium includes a substrate, a first protective layer, a recording layer, a second protective layer, and a reflecting layer.

When a recording/erasing operation is to be performed using such an information recording medium, a light beam is radiated on the entire surface of the information recording medium to heat the information recording medium at a temperature lower than the melting point of the material of the recording layer, thereby setting the material of a recording layer in a high crystallinity (a state in which atoms are relatively regularly arranged; to be referred to as a crystalline state hereinafter). Strong pulse light having a short wavelength is radiated on the information recording medium to heat and melt the recording layer, and the recording layer is rapidly cooled. In this manner, part on which the pulse light is radiated has a low crystallinity (a state in which an atomic arrangement is disturbed; to be referred to as an amorphous state hereinafter).

As described above, since the crystalline and amorphous states have different atomic arrangement structures, these states have different optical characteristics such as transmittances or reflectances. Information can be recorded by using the difference between the optical characteristics. Information recorded as described above can be erased as follows. That is, weak pulse light having a long wavelength is radiated on the recorded portion to heat the recorded portion to a temperature which is equal to or lower than the melting point of the material constituting the recording layer, and the recorded portion is gradually cooled. This is because the state of the material of the recorded portion is returned to the original state, i.e., the crystalline state.

In an actual information recording medium, a change in reflectance between the crystalline state and the amorphous state is used as a signal as described above. For this reason, the thickness of each layer is designed in consideration of the optical interference effects of the interface between the protective layer and the recording layer and the interface between the protective layer and the reflecting layer. Therefore, according to the optical constants of the materials used in the information recording medium, there are optimal thicknesses capable of obtaining a large change in reflectance.

The following fact is known. That is, when the thickness of the protective layer increases, heat flowing from the recording layer to the reflecting layer is interfered, and rapid cooling cannot be satisfactorily controlled by modulation of a laser power, thereby degrading recording characteristics. Therefore, in a conventional technique, when GeSbTe or the like is used as the material of the recording layer, the thickness of the protective layer is set to fall within a range of 100 to 200Å, thereby performing recording such that the reflectance decreases (T. Ohta et al. JJAP. Vol. 128 (1989) SUPPLEMENT 28-3, pp. 123-128).

As a recording method using such an information recording medium described above, mark position recording and mark length recording are known. That is, recording marks having the same shape are formed, and information is obtained by intervals between the centers of the recording marks. In the mark length recording, recording marks having lengths corresponding to information are formed, and information is obtained by the lengths of the recording marks.

In a conventional information recording medium for mark position recording, the size of a recorded portion (amorphous area) is not larger than that of a non-recorded portion (crystalline area) on a recording layer. On the other hand, in an information recording medium for mark length recording, the size of a recorded portion is larger than that of the recorded portion obtained in the mark position recording. For example, assume that the diameter of the recording mark is 0.78 $\mu$m, and that recording is performed at the same density in mark position recording and mark length recording. In this case, a ratio of the area of the recorded portion to the area of the non-recorded portion on the recording layer in the mark position recording is 26%, and a ratio of the area of the recorded portion to the area of the non-recorded portion on the recording layer in the mark length recording is 44%. When these recording methods are applied to a conventional information recording medium in which recording is performed such that the reflectance decreases, as the ratio of the area of the recorded portion to the area of the non-recorded portion is larger, an average reflectance obtained during a reproducing operation is lower than that obtained before a recording operation is performed.

In the mark position recording, even when recording is performed such that the reflectance decreases, a certain amount of reflected light can be obtained, and focusing and tracking operations are performed by a normal optical disk drive to reproduce a signal. However, in an information recording medium in which recording is performed such that the reflectance decreases, when recording marks are formed at a high density in mark length recording in accordance with high-density recording, a ratio of the area of the recorded portion to the entire area of the recording layer increases in a reproducing operation. For this reason, the average reflectance decreases to 60% or less of the original average reflectance. In general, in order to stably perform focusing and tracking operations, at least a reflectance of about 10% is required. Therefore, in this case, an amount of reflected light required for the focusing and tracking operations cannot be obtained. In order to increase the reflectance, the thickness of the second protective layer must be increased. In this case, a large reflectance change amount cannot be obtained.

When an information recording medium in which recording is performed such that the reflectance decreases is used, if light does not escape from the lower surface of the reflecting layer, the absorbance of the recorded portion increases, and the absorbance of the non-recorded portion decreases accordingly. For this reason, an absorbance obtained when a new mark is overwritten in the recorded portion is different from an absorbance obtained when a new mark is overwritten in the non-recorded portion, and the rates of increase in temperature of the recorded and non-recorded portions of the recording layer are different from each other during a recording operation. In addition, latent heat is required to melt the non-recorded portion because the state of the non-recorded portion is a crystalline state. For this reason, when the recorded and non-recorded portions are heated by the same laser power, the difference between the rates of temperature increase in temperature further increases. For this reason, the sizes of formed recording marks vary depending on areas in which the recording masks are formed. Therefore, a recording scheme in which the edge portions of recording marks have information is used, the edge portions fluctuate depending on their positions on the recording layer.

SUMMARY OF THE INVENTION

The present invention is made in consideration of the above circumstances, and has as its object to provide an information recording medium capable of stably performing focusing and tracking operations and a recording method using this information recording medium.

It is another object of the present invention to provide an information recording medium comprising a metal layer formed on a transparent substrate, a protective layer formed on the metal layer, a recording layer formed on the metal layer and having optical characteristics changed by radiating a recording light beam on the recording layer, and a reflecting layer formed on the recording layer, wherein a reflectance obtained after a recording operation is performed is higher than a reflectance obtained before the recording operation is performed, and to provide a recording method using this information recording medium.

According to the present invention, there is provided an information recording medium comprising a substrate, a metal layer formed on the substrate, and a recording layer formed on the metal layer and being formed a recorded portion and a non-recorded portion by changing optical characteristics by radiating a recording light beam, wherein the recording layer contains GeSbTe, a reflectance of the recorded portion of the recording layer is higher than that of the non-recorded portion, and a reflectance of the non-recorded portion is not less than 10%.

According to the present invention, there is provided an information recording medium comprising: a transparent substrate; a metal layer formed on the transparent substrate and having a thickness of 80 to 200 Å; a first protective layer formed on the metal layer and having a thickness of 1,200 to 1,600 Å or 3,100 to 3,500 Å; a recording layer formed on the first protective layer having a thickness of not more than 350 Å, having optical characteristics changed by radiating a recording light beam on the recording layer, and including GeSbTe; a second protective layer formed on the recording layer and having a thickness of 200 to 1,600 Å or 1,900 to 3,400 Å; and a reflecting layer formed on the second protective layer and having a thickness of not less than 1,000 Å.

The information recording medium according to the present invention is characterized in that, a semitransparent metal layer is interposed between the substrate and the first protective layer in a conventional layer arrangement (substrate/first protective layer/second protective layer/reflecting layer), and the interferences of the interfaces between these layers and the interference of the interface between the substrate and the first protective layer are utilized, thereby obtaining a layer arrangement in which recording is performed such that a reflectance increases during a recording operation unlike the conventional layer arrangement.

In this manner, even when mark length recording is performed, the reflectance of the recorded portion increases, a sufficient amount of reflected light can be obtained, and focusing and tracking operations can be stably performed. In addition, the recorded portion has a low absorbance, and the non-recorded portion has a high absorbance. For this reason, the difference between the rates of increase in temperature obtained when new marks are respectively overwritten in the recorded and non-recorded portions can be corrected, and recording marks having the same size can be formed. Therefore, recording in which a variation in edge is suppressed can be performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 7 is a view for explaining an apparatus for recording/reproducing information using the information recording medium according to the present invention.

DETAILED DESCRIPTION OF THE PREFERRED EMBODIMENT

An embodiment of the present invention will be described below with reference to the accompanying drawings.

Figure 1:
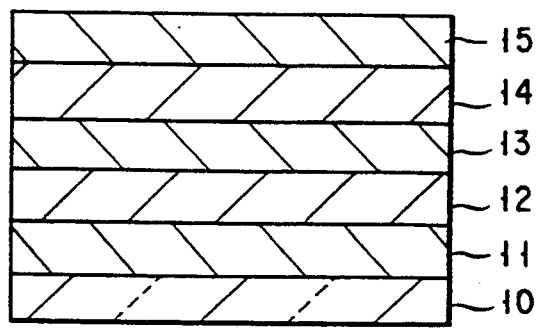
FIG. 1 is a sectional view showing an information recording medium according to an embodiment of the present invention.

FIG. 1 is a sectional view showing an information recording medium according to an embodiment of the present invention. In FIG. 1, reference numeral 10 denotes a transparent substrate. A semitransparent metal layer 11 is formed on the transparent substrate 10. A protective layer 12, a recording layer 13, a protective layer 14, and a reflecting layer 15 are sequentially stacked on the metal layer 11.

As the material of the transparent substrate 10, glass or a plastic material such as an acrylic resin or a polycarbonate resin can be used. The thickness of the transparent substrate 10 is about 0.5 to 1.5 mm. As the material of the metal layer 11, a metal such as Au, Ag, Cu, or Cr or an alloy containing these metals can be used. As the material of the first and second protective layers 12 and 14, ZnS, $SiO_2$, $Al_2O_3$, or a mixture thereof can be used. As the material of the recording layer 13, a chalcogenite such as GeSbTe can be used. As the material of the protective layer 14, Al, Au, or an alloy using Al or Au as a base material and containing Ti, Mo, Zr, or Cr can be used. The thickness of the protective layer 14 is preferably set to be 1,000 Å or more because the protective layer 14 is used not only to obtain optical reflection but also to effectively disperse heat generated by the recording layer 13. Note that each layer can be formed by deposition such as vacuum deposition or sputtering.

Figure 2:
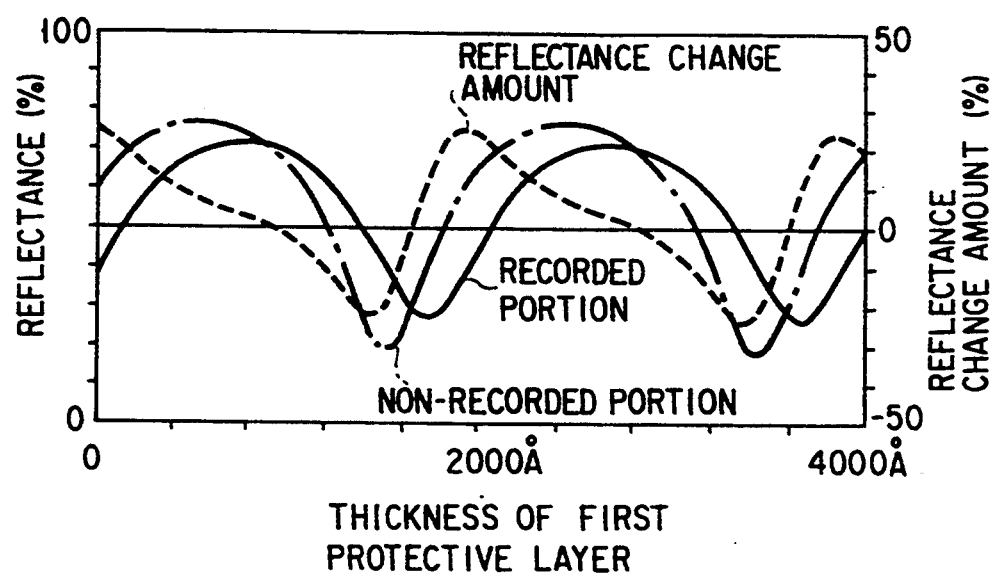
FIG. 2 is a graph showing the reflectances of recorded and non-recorded portions and a reflectance change amount when the thickness of a first protective layer is changed in the information recording medium according to the present invention.

FIG. 2 is a graph showing the reflectances of recorded and non-recorded portions and a reflectance change amount when the thickness of the first protective layer 12 is changed in the information recording medium according to the present invention.

In this case, an Au layer having a thickness of 100 Å is used as the metal layer, a GeSbTe layer having a thickness of 200 Å is used as the recording layer, a ZnS:$SiO_2$ layer having a thickness of 500 Å is used as the second protective layer, and an Al layer having a thickness of 2,000 Å is used as the reflecting layer.

Since incident light from the transparent substrate causes multiple reflection at the interfaces between the layers, the rates of change in reflectance varies depending on the thickness of the first protective layer. Referring to FIG. 2, when the thickness of the first protective layer falls within a range of 1,000 to 1,700 Å or a range of 2,800 to 3,600 Å, the reflectance increases during a recording operation. In this case, when the thickness of the first protective layer is set to be 1,500 Å or 3,400 Å, a reflectance change amount becomes a maximum of 22%. In this case, since the reflectance of the non-recorded portion is 20%, the reflectance of the recorded portion increases after the recording operation is performed. Therefore, focusing and tracking operations can be stably performed, and a maximum reflectance change amount can be obtained. An appropriate thickness of the first protective layer falls within a range of 1,200 to 1,600 Å or a range of 3,100 to 3,500 Å in which half of the maximum reflectance change amount, i.e., 22%, is obtained.

Figure 3:
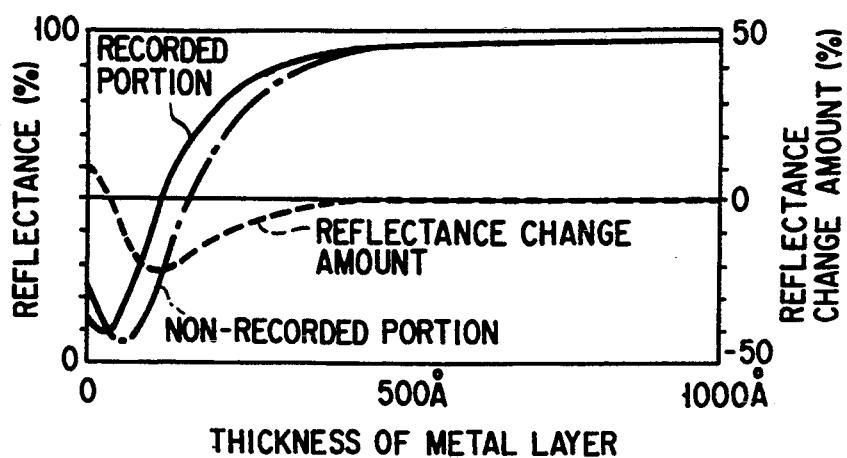
FIG. 3 is a graph showing the reflectances of the recorded and non-recorded portions and a reflectance change amount when the thickness of a metal layer is changed in the information recording medium according to the present invention.

FIG. 3 is a graph showing the reflectances of the recorded and non-recorded portions and a reflectance change amount when the thickness of the metal layer consisting of Au is changed in the information recording medium having the above arrangement. As is apparent from FIG. 3, when the thickness of the metal layer exceeds 40 Å, the reflectance of the recorded portion is higher than that of the non-recorded portion, and the reflectance increases during a recording operation. This is because, when the thickness of the metal layer exceeds 40 Å, an interference effect at the interface between the transparent substrate and the metal layer appears. In addition, when the thickness of the metal layer exceeds 80 Å, the reflectance of the non-recorded portion exceeds 10% and monotonously increases.

On the other hand, in consideration of a reflectance change amount, a maximum reflectance change amount can be obtained when the thickness of the metal layer is 120 Å. However, the thickness of the metal layer exceeds 200 Å, the reflectance change amount become 50% or less of the maximum reflectance change amount. For this reason, when the thickness of the metal layer is 80 to 200 Å, the reflectance of the non-recorded portion is 10% or more, focusing and tracking operations can be stably performed, and a large reflectance change amount can be obtained. In this case, the birefringence of Au is 0.15–5.3i with respect to a laser beam having a wavelength of 690 nm. Therefore, as the material of the metal layer, not only Au but also a metal having the same birefringence as that of Au can be used. As the metal, Ag, Cu, Cr, or an alloy containing these metals can be used.

Figure 4:
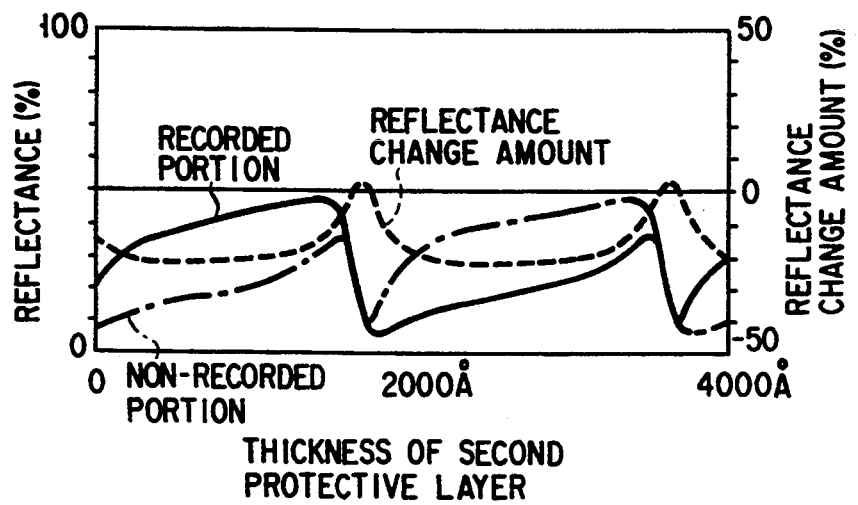
FIG. 4 is a graph showing the reflectances of the recorded and non-recorded portions and a reflectance change amount when the thickness of a second protective layer is changed in the information recording medium according to the present invention.

FIG. 4 is a graph showing the reflectances of the recorded and non-recorded portions and a reflectance change amount when the thickness of the second protective layer is changed in the information recording medium having the above arrangement. As is apparent from FIG. 4, a sufficient reflectance change amount in which the reflectances increase in almost all areas during a recording operation with respect to the thickness of the second protective layer can be obtained. When the thickness of the second protective layer falls within a range of 200 to 1,600 Å or a range of 1,900 to 3,400 Å, a reflectance change amount of 20% or more and a reflectance of 10% or more in the non-recorded portion can be obtained. In this manner, in the information recording medium according to the present invention, even if the thickness of the second protective layer is 200 Å, a sufficient reflectance change amount can be obtained. For this reason, rapid cooling which is performed by modulation of a laser power and which is a problem in a conventional information recording medium can be controlled.

Figure 5:
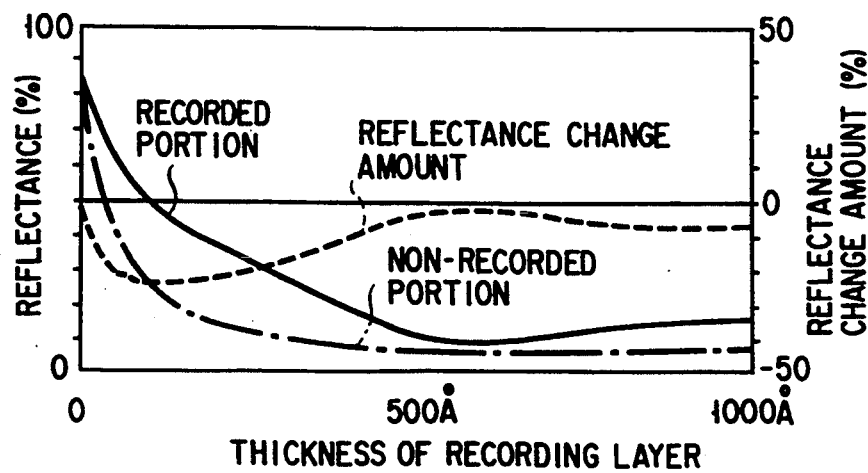
FIG. 5 is a graph showing the reflectances of the recorded and non-recorded portions and a reflectance change amount when the thickness of a recording layer is changed in the information recording medium according to the present invention.

FIG. 5 is a graph showing the reflectances of the recorded and non-recorded portions and a reflectance change amount when the thickness of the recording layer is changed in the information recording medium having the above arrangement. As is apparent from FIG. 5, when the thickness of the recording layer is 500 Å or less, a change in reflectance can be obtained. However, in consideration of both the reflectance of the non-recorded portion and the change in reflectance, the thickness of the recording layer is preferably set to be 350 Å or less.

In consideration of the characteristics of each layer shown in FIGS. 2 to 5, the thickness of each layer is set such that the reflectance obtained after a recording operation is performed is higher than the reflectance before the recording operation is performed. That is, the absolute thicknesses of the metal layer 11 and the recording layer 13 are defined as is apparent from the FIGS. 3 and 5, respectively. The thickness of the reflecting layer 15 must be set to be a thickness, e.g., 1,000 Å or more, at which the reflecting layer 15 does not substantially transmit light.

Figure 6:
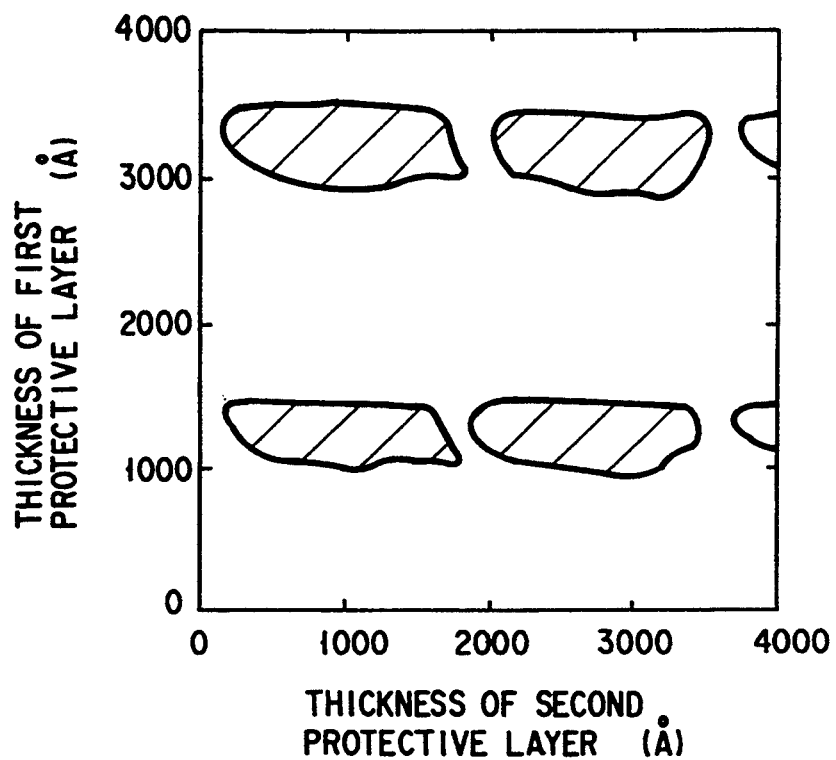
FIG. 6 is a graph showing a combination between the thickness of the first protective layer and the thickness of the second protective layer to obtain the effect of the present invention.

On the other hand, when the thicknesses of the first and second protective layers 12 and 14 increase, as is apparent from FIG. 4, an area having a thickness value at which a reflectance obtained after a recording operation is performed is higher than a reflectance obtained before the recording operation is performed and an area having a thickness value at which the reflectance obtained after the recording operation is performed is lower than the reflectance obtained before the recording operation is performed periodically appear. For this reason, a combination of the thicknesses of the protective layers 12 and 14 must be appropriately selected such that the reflectance obtained after the recording operation is performed is higher than the reflectance obtained before the recording operation is performed. For example, when the thicknesses of the metal layer, the recording layer, and the reflecting layer are set to be 100 Å, 200 Å, and 2,000 Å, respectively, a combination of the thicknesses of the first and second protective layers 12 and 14 in which the reflectance obtained after the recording operation is performed is higher than the reflectance before the recording operation is performed by a change in reflectance of more than 10% is within a hatched area shown in FIG. 6. Therefore, when the thicknesses of the first and second protective layers 12 and 14 are set within the hatched area shown in FIG. 6, an information recording medium in which the reflectance obtained after the recording operation is performed is higher than the reflectance obtained before the recording operation is performed can be manufactured.

In this embodiment, a calculation result obtained using a laser beam having a wavelength of 690 nm is exemplified. For this reason, when the wavelength of the laser beam used for a recording operation changes, the thickness of each layer is appropriately changed in accordance with the wavelength. In addition, the optimal thickness of each layer is changed in accordance with the shape of a groove, formed in the transparent substrate, for tracking a light beam. However, in any case, when the thickness of each layer is set such that the reflectance increases during the recording operation and the reflectance of the non-recorded portion is 10% or more, this embodiment does not depart from the spirit and scope of the present invention.

A case wherein information recording is performed using such an information recording medium will be described below. As an information recording medium used in this case, an optical disk obtained as follows was used. That is, an Au layer as a metal layer having a thickness of 100 Å. a ZnS: SiO$_2$ layer having a thickness of 1,400 Å and serving as a first protective layer, a GeSbTe (composition: atomic ratio of 2:2:5) layer having a thickness of 300 Å and serving as a recording layer, a ZnS: SiO$_2$ layer having a thickness of 300 Å and serving as a second protective layer, and an Al layer having a thickness of 2,000 Å and serving as a reflecting layer were sequentially formed by vacuum sputtering on a polycarbonate disk having a groove, a diameter of 90 mm, and a thickness of 1.2 mm.

FIG. 7 is a view for explaining an apparatus for recording/reproducing information using the information recording medium according to the present invention. Referring to FIG. 7, an optical disk 21 is rotated by a motor 22 at a predetermined speed. This motor 22 is controlled by a motor control circuit 38. An optical head 23 performs recording/reproducing operations of information on the optical disk 21. This optical head 23 is fixed to a drive coil 33 constituting the movable portion of a linear motor 51. This drive coil 33 is connected to a linear motor control circuit 37. A permanent magnet (not shown) is arranged at the fixed portion of the linear motor 51. When the drive coil 33 is excited by the linear motor control circuit 37, the optical head 23 moves at an almost constant speed in the radial direction of the optical disk 21.

In the optical head 23, an objective lens 26 is held by a wire or leaf spring (not shown), and this objective lens 26 is moved by a drive coil 25 in a focusing direction (the direction of the optical axis of the lens) and can be moved by a drive coil 24 in a tracking direction (the direction perpendicular to the optical axis of the lens).

A laser beam generated by a laser diode (semiconductor laser oscillator) 29 driven by a laser control circuit 34 is radiated on the optical disk 21 through a collimator lens 31a, a half prism 31b, and the objective lens 26. The beam reflected by the optical disk 21 is guided to a photodetector 28 through the objective lens 26, the half prism 31b, a condenser lens 30a, and a cylindrical lens 30b. This photodetector 28 is constituted by four divided photodetective cells 28a, 28b, 28c, and 28d.

An output signal from the photodetective cell 28a of the photodetector 28 is supplied to one terminal of each of adders 50a and 50c through an amplifier 32a, an output signal from the photodetective cell 28b is supplied to one terminal of each of adders 50b and 50d through an amplifier 32b, an output signal from the photodetective cell 28c is supplied to the other terminal of each of the adders 50b and 50c through an amplifier 32c, and an output signal from the photodetective cell 28d is supplied to the other terminal of each of the adders 50a and 50d through an amplifier 32d. An output signal from the adder 50a is supplied to the inverting input terminal of a differential amplifier OP1, and an output signal from the adder 50b is supplied to the non-inverting input terminal of the differential amplifier OP1. In this manner, the differential amplifier OP1 supplies a track difference signal to a tracking control circuit 36 in accordance with the difference between the outputs from the adders 50a and 50b. This tracking control circuit 36 forms a track drive signal in accordance with the track difference signal supplied from the differential amplifier OP1.

The track drive signal output from the tracking control circuit 36 is supplied to the drive coil 24 located in the tracking direction. The track difference signal used in the tracking control circuit 36 is supplied to the linear motor control circuit 37. The linear motor control circuit 37 applies a voltage corresponding to a moving speed to a drive coil (conductive line) 33 in the linear motor 51 (to be described later) in accordance with the track difference signal from the tracking control circuit 36 and a moving control signal from a CPU 43.

In the linear motor control circuit 37, a speed detection circuit (not shown) is arranged. This speed detection circuit detects a relative speed between the drive coil 33 and a magnetic member (not shown), i.e., the moving speed of the linear motor 51, using an electrical change in the drive coil 33 occurring when the drive coil 33 in the linear motor 51 crosses a magnetic flux generated by the magnetic member.

An output signal from the adder 50c is supplied to the inverting input terminal of a differential amplifier OP2, and an output signal from the adder 50d is supplied to the non-inverting input terminal of the differential amplifier OP2. In this manner, the differential amplifier OP2 supplies a signal related to a focal point to a focusing control circuit 35 in accordance with the difference between the outputs from the adders 50c and 50d. An output signal from the focusing control circuit 35 is supplied to the focusing drive coil 25 to control the drive coil 25 such that a laser beam is always just focused on the optical disk 21.

A sum signal of the outputs from the photodetective cells 28a to 28d of the photodetector 28 obtained when the focusing and tracking operations are performed as described above, i.e., the output signals from the adders 50a and 50b, are changed depending on a change in reflectance represented by a pit (recorded information) formed in the track. These signals are supplied to a signal processing circuit 39. In this signal processing circuit 39, recorded information and address information (track number, sector number, and the like) are reproduced.

The laser emission output from the laser diode 29 is monitored by a photodiode 52, converted into an electrical signal, and fed back to the laser control circuit 34, thereby stabilizing the laser emission output from the laser diode 29. A laser emission ON/OFF signal and a recording data signal from a recording data signal control circuit 53 constituted by a microprocessor and the like are input to the laser control circuit 34. A high-frequency current (to be described later) output from a high-frequency current generating circuit 54 through a coupling capacitor 55 is superposed on a drive current output from the laser control circuit 34.

In this apparatus, a D/A converter 42 used for performing transmission/reception of information between the focusing control circuit 35, the tracking control circuit 36, the linear motor control circuit 37, and the CPU 43 is arranged. The tracking control circuit 36 causes the objective lens 26 to move in accordance with a track jump signal supplied from the CPU 43 through the D/A converter 42 to make a light beam to move by one track. The laser control circuit 34, the focusing control circuit 35, the tracking control circuit 36, the linear motor control circuit 37, the motor control circuit 38, the signal processing circuit 39, the recording data signal control circuit 53, the high-frequency current generating circuit 54, and the like are controlled by the CPU 43 through a bus line 40. The CPU 43 performs a predetermined operation in accordance with a program stored in a memory 44.

In the apparatus having the above arrangement, an optical disk having a recording layer crystallized by radiating an argon laser beam on the recording layer in advance was arranged, and signals were recorded while the motor was rotated. At this time, a rotational speed was set to be 3,000 rpm. As a recording signal, random data (marks having different lengths) having a 1,7 RLL (Run Length Limited) code in which the length of a shortest mark was set to be 1.6 μm. As a result, focusing and tracking operations could be stably performed after and before a recording operation was performed. At this time, the reflectance of a non-recorded portion was 13%, and the reflectance of a recorded portion was 35%.

Figure 8:
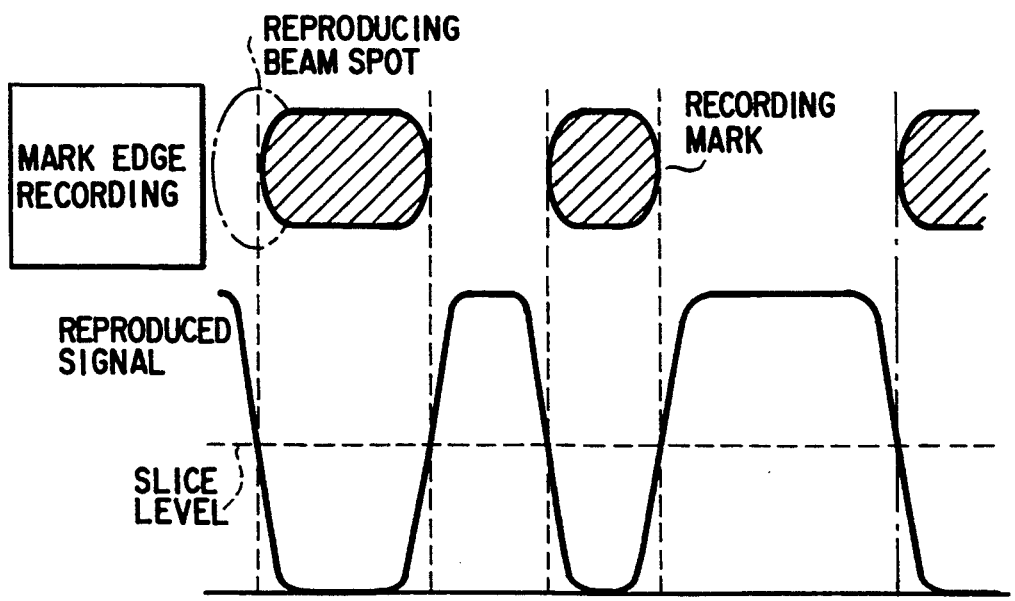
FIG. 8 is a view for explaining a reproduced signal in an information recording medium in which information is recorded using the apparatus shown in FIG. 7.

A reproduced signal obtained at this time is shown in FIG. 8. The intermediate point of a signal amplitude is used as the slice level of digital data, and digital data is formed while the digital data is compared with a signal. When a digital signal actually reproduced was compared with the random data having a 1,7 RLL code and used in the recording operation, the random data completely coincided with the digital signal. Therefore, it was confirmed that data having this code could be recorded/reproduced.

As has been described above, an information recording medium according to the present invention comprises a metal layer formed on a transparent substrate, a recording layer formed on the metal layer and having optical characteristics changed by radiating a recording light beam on the recording layer, and a reflecting layer formed on the recording layer. A reflectance obtained after a recording operation is performed increases. For this reason, even when mark length recording is performed, a sufficient amount of reflected light can be obtained, and focusing/tracking operations can be stably performed. In addition, mark length recording/reproducing can be stably performed using the information recording medium.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information recording medium comprising:
   a transparent substrate;
   a semitransparent metal layer formed on said transparent substrate, having a thickness of 80 to 200 Å, and made of a metal selected from the group consisting of Au, Ag. Cu. Cr and an alloy thereof;
   a first protective layer formed on said metal layer and having a thickness of 1,200 to 1,600 Å or 3,100 to 3,500 Å;
   a recording layer formed on said first protective layer, having a thickness of not more than 350 Å, having optical characteristics changed by irradiation with a recording light beam, and including GeSbTe;
   a second protective layer formed on said recording layer and having a thickness of 200 to 1,600 Å or 1,900 to 3,400 Å; and
   a reflecting layer formed on said second protective layer and having a thickness of not less than 1,000 Å;
   wherein said semitransparent metal layer causes an incident light from the substrate side to produce an interference effect within a region between said transparent substrate and said first protective layer.

* * * * *